United States Patent
Morgan et al.

(10) Patent No.: US 7,634,701 B2
(45) Date of Patent: *Dec. 15, 2009

(54) METHOD AND SYSTEM FOR PROTECTING PROCESSORS FROM UNAUTHORIZED DEBUG ACCESS

(76) Inventors: Andrew Morgan, 18163 Mountain View Ct., Los Gatos, CA (US) 95033; David Dunn, 4525 191st Pl. NE., Sammamish, WA (US) 98074

( * ) Notice: Subject to any disclaimer, the term of this patent is extended or adjusted under 35 U.S.C. 154(b) by 0 days.

This patent is subject to a terminal disclaimer.

(21) Appl. No.: 12/033,864

(22) Filed: Feb. 19, 2008

(65) Prior Publication Data

US 2008/0148118 A1 Jun. 19, 2008

Related U.S. Application Data

(63) Continuation of application No. 11/241,104, filed on Sep. 29, 2005, now Pat. No. 7,334,173, which is a continuation-in-part of application No. 11/169,403, filed on Jun. 28, 2005.

(51) Int. Cl.
*G01R 31/28* (2006.01)

(52) U.S. Cl. .................................... 714/726

(58) Field of Classification Search ................ 714/726
See application file for complete search history.

(56) References Cited

U.S. PATENT DOCUMENTS

| | | | |
|---|---|---|---|
| 6,968,420 B1 | 11/2005 | Giles et al. | |
| 7,080,789 B2 | 7/2006 | Leaming | |
| 7,117,352 B1 | 10/2006 | Giles et al. | |
| 2003/0204801 A1 | 10/2003 | Tkacik et al. | |
| 2003/0206627 A1 | 11/2003 | Penugonda et al. | |
| 2005/0066189 A1 | 3/2005 | Moss et al. | |
| 2006/0282734 A1 | 12/2006 | Milne et al. | |

FOREIGN PATENT DOCUMENTS

| | | |
|---|---|---|
| JP | 14228716 | 8/2002 |
| JP | 2002228716 | 2/2008 |

OTHER PUBLICATIONS

International Search Report, Mail Date Mar. 12, 2007; International Application No. PCT/US2006/038168; International Filing Date Sep. 28, 2006.
PCT Written Opinion of the International Searching Authority; Mail Date Mar. 12, 2007; International Application No. PCT/US2006/038168; International Filing Date Sep. 28, 2006.
Non-Final Office Action Dated Oct. 31, 2008; U.S. Appl. No. 11/169,403.
Notice of Allowance Dated Jan. 28, 2009; U.S. Appl. No. 11/169,403.
Notice of Allowance Dated May 19, 2009; U.S. Appl. No. 11/169,403.
Non-Final Office Action Dated Feb. 19, 2007; U.S. Appl. No. 11/241,104.
Notice of Allowance Dated May 2, 2007; U.S. Appl. No. 11/241,104.
Notice of Allowance Dated Aug. 31, 2007; U.S. Appl. No. 11/241,104.
Notice of Allowance Dated Dec. 4, 2007; U.S. Appl. No. 11/241,104.

*Primary Examiner*—James C Kerveros

(57) ABSTRACT

A method for securing a scan test architecture by performing an authentication operation to authorize use of a protected scan chain.

20 Claims, 10 Drawing Sheets

METHOD AND SYSTEM FOR PROTECTING PROCESSORS FROM UNAUTHORIZED DEBUG ACCESS

CROSS-REFERENCE TO RELATED APPLICATIONS

This patent application is a continuation of and claims the benefit of U.S. patent application Ser. No. 11/241,104 entitled "Method and System for Protecting Processors from Unauthorized Debug Access", by Morgan et al., filed on Sep. 29, 2005, now U.S. Pat. No. 7,334,173, issued on Feb. 19, 2008, which is a continuation-in-part of U.S. patent application Ser. No. 11/169,403, entitled "Method and System for Providing Trusted Access to a JTAG Scan Interface in a Microprocessor", by Dunn et al., filed on Jun. 28, 2005, which are hereby incorporated by reference.

TECHNICAL FIELD

Embodiments of the present invention relate to the field of digital computer systems. More particularly, embodiments of the present invention relate generally to securing scan interfaces.

BACKGROUND ART

Many processors support interfaces intended for debugging, profiling, or aiding the manufacturing process of a chip as it is tested during pre-packaging and after packaging. These support interfaces allow access to internal states of the chip. For example, this includes support for post-shipment chip return failure analysis. Such access is open and frequently implemented via a low pin count interface to the CPU, such as Joint Test Action Group (JTAG) scan chain interface. However, when a processor contains processor specific secrets, or is requested to perform sensitive (secure and trusted) operations, these support interfaces (e.g., JTAG scan) put these secrets at risk of discovery. That is, preservation of sensitive information can be compromised due to unfettered access to the processors and memory of each of the conventional digital computer systems through these support interfaces. Thus, it would be advantageous to provide a solution that can provide a secure scan interface.

DISCLOSURE OF THE INVENTION

Embodiments of the present invention provide a method and system for securing a scan test architecture by performing an authentication operation to authorize use of a protected scan chain.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODES FOR CARRYING OUT THE INVENTION

Figure 1:
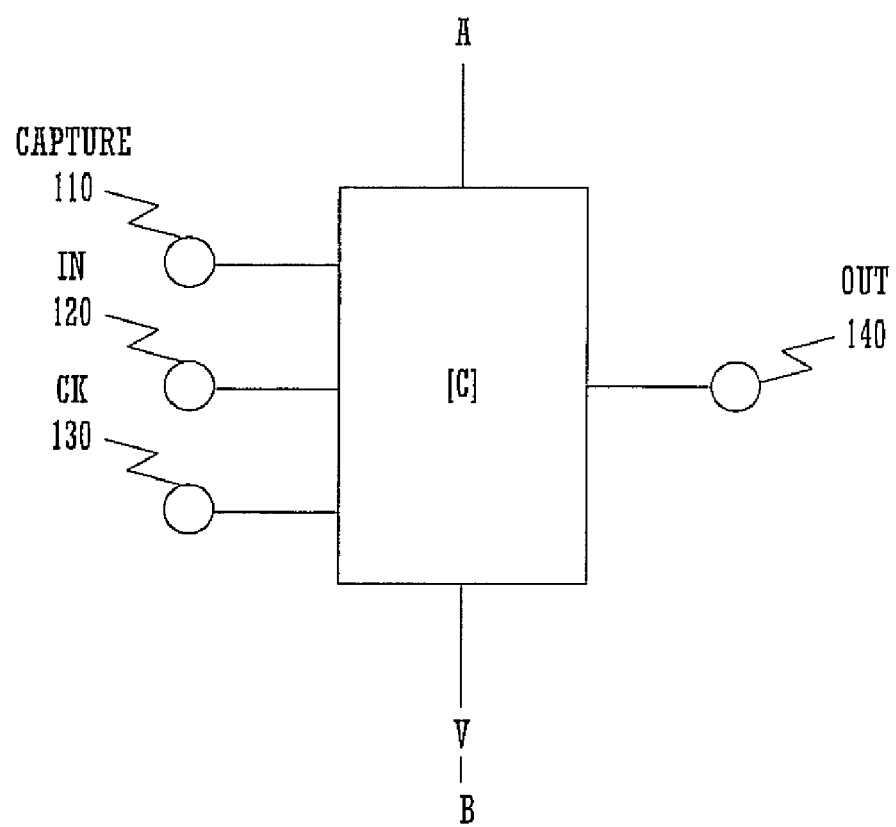
FIG. 1 is a diagram of a scan element that implements a scan chain for a scan test interface, in accordance with one embodiment of the present invention.

Reference will now be made in detail to the preferred embodiments of the present invention, a method and system for securing a scan test architecture by performing an authentication operation to authorize use of a protected scan chain, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments of the present invention can be implemented as hardware within a computer system. The computer system can be a personal computer, notebook computer, server computer, mainframe, networked computer, handheld computer, personal digital assistant, workstation, and the like. This hardware is operable for securing a scan test architecture by performing an authentication operation to authorize use of a protected scan chain. In one embodiment, the computer system includes a processor coupled to a bus and memory storage coupled to the bus. The memory storage can be volatile or non-volatile and can include removable storage media. The computer can also include a display, provision for data input and output, etc.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art.

A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "disabling," "enabling," "performing," "controlling," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Accordingly, embodiments of the present invention provide a method and system for securing a scan based test architecture by performing an authentication operation to authorize use of a protected scan chain. Embodiments of the present invention and their benefits are further described below.

Scan Chain Introduction

Embodiments of the present invention implement a scan chain for a scan test interface. In one embodiment, the scan test interface is a Joint Test Action Group (JTAG) implemented scan test interface. While embodiments of the present invention are discussed within the context of JTAG boundary test interfaces, other embodiments are well suited to securing scan test interfaces that are not limited to JTAG scan test interfaces. Still other embodiments of the present invention are well suited to securing any type of interface into an integrated circuit.

FIG. 1 is a diagram of a scan element 100 that implements a scan chain for a scan test interface. The scan test interface tests the internal states of an integrated circuit, in one embodiment. For example, boundary scan elements in an integrated circuit can capture data from core pin or logic signals, or input data into the core pins or logic signals. Captured data is serially shifted out. In addition, input data is serially shifted into the boundary scan elements.

FIG. 1 provides a working definition of single element scan-chain (scalable, simple, IO chains). Such scan chains are standard logic implementations well known in the art. As shown in FIG. 1, the basic scan element 100 provides an interface to an internal logic storage element, [A] and [B], embedded within a larger system (e.g., an integrated circuit). The scan element 100 also holds a logic (true=1 or false=0) state [C].

The scan element 100 is used for extracting state [A] from the integrated circuit. In addition, the scan element 100 is used for inserting state [B] into the integrated circuit.

In one embodiment, during normal operation, the scan-clock signal 130 is externally held at zero. In this state, [B] is a direct mirror of the state of the scan element, [C]. That is, any target internal logic driven from [B] can be said to be driven by the scan logic state [C].

The state of the scan logic [C] is mirrored into the out scan signal 140 on the rising edge of the scan-clock signal 130. Also, on the falling edge of the scan-clock signal 130, the state of [C] is loaded from either target internal state [A], or the in scan signal 120 depending on the state of the capture signal 110. That is, if the capture signal 110 is logic high on the falling edge of scan-clock signal 130, in one embodiment, then [C] is set from target internal state [A]. On the other hand, if the capture signal 110 is logic low on the falling-edge of the scan-clock signal 130, then [C] is set from the in scan signal 120.

Figure 2:
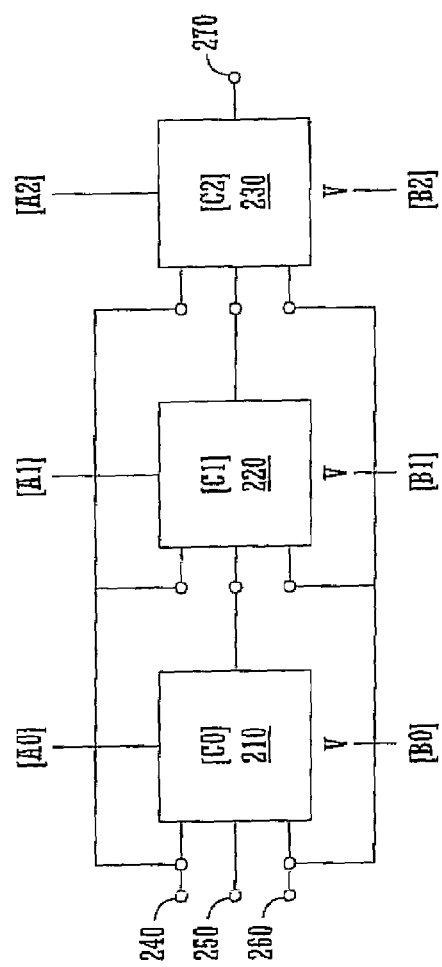
FIG. 2 is a diagram illustrating a scan chain of elements, in accordance with one embodiment of the present invention.

FIG. 2 is a diagram illustrating a scan chain 200 of elements, in accordance with one embodiment of the present invention. For instance, scan element 100 of FIG. 1 can be scaled by tying a number of scan-logic elements together, to create a scan-chain. In scan chain 200, there are three scan elements shown, scan element 210, scan element 220, and scan element 230. In accordance with embodiments of the present invention, the scan chain 200 enables the setting and viewing of scan-chain states {Cn} through a serial (low pin count) interface, in one embodiment, where {Cn} has 'n' scan elements numbered 0 . . . (n−1).

To tie the scan elements 210, 220, and 230 together, the in pin for each of the scan elements is tied to an out pin from the preceding scan element. For instance the input signal for the scan element 220 is tied to the output signal to the scan element 210. Also, an input signal 250 and an output signal 270 is provided for the scan chain 200.

As shown in FIG. 2, the capture pins 240 for the scan elements in the scan chain 200 are wired together. In addition, the scan clock pin 260 for the scan elements in the scan chain 200 are wired together.

Figure 3:
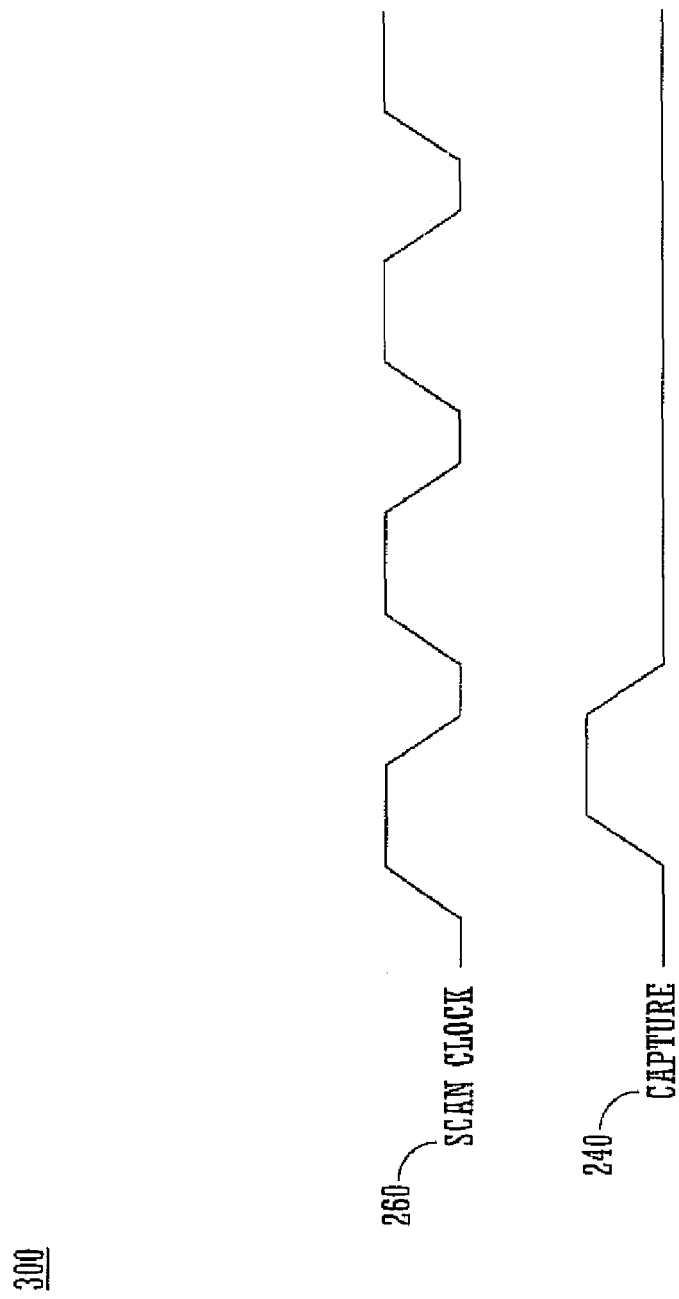
FIG. 3 is a timing diagram of the signals implemented within the scan chain of FIG. 2, in accordance with one embodiment of the present invention.

FIG. 3 is a timing diagram of the signals implemented within the scan chain 200 of FIG. 2, in accordance with one embodiment of the present invention. As shown in FIG. 3, 1+n scan-clock cycles are required to view the internal target state {An} associated with the scan chain 200.

For example, in the case n=3 of FIG. 2, the scan-clock signal 260 is driven. In addition, the capture signal 240 is initially driven high to capture the internal states (e.g., A0, A1, and A2) of the scan elements in the scan chain 200 simultaneously. That is, instead of reading the signal from the input pin of each of the scan elements, on the falling edge of the scan clock signal 260, the internal state of the processor of each scan element (e.g., A0, A1, or A2) is taken.

Thereafter, the capture signal 240 is driven low so that the internal states will be serially driven out as an output signal 270. That is, if the capture signal 240 is asserted in a low state for the duration, each element {Cn} is set by scanning the internal state of the previous scan element through the chain of 'in' signals. As such, the internal states of the processor of each scan element (e.g., A0, A1, and A2) are serially clocked out.

Additionally, internal state [B] is also inputted into the scan chain through the same methodology, in another embodiment.

Figure 4:
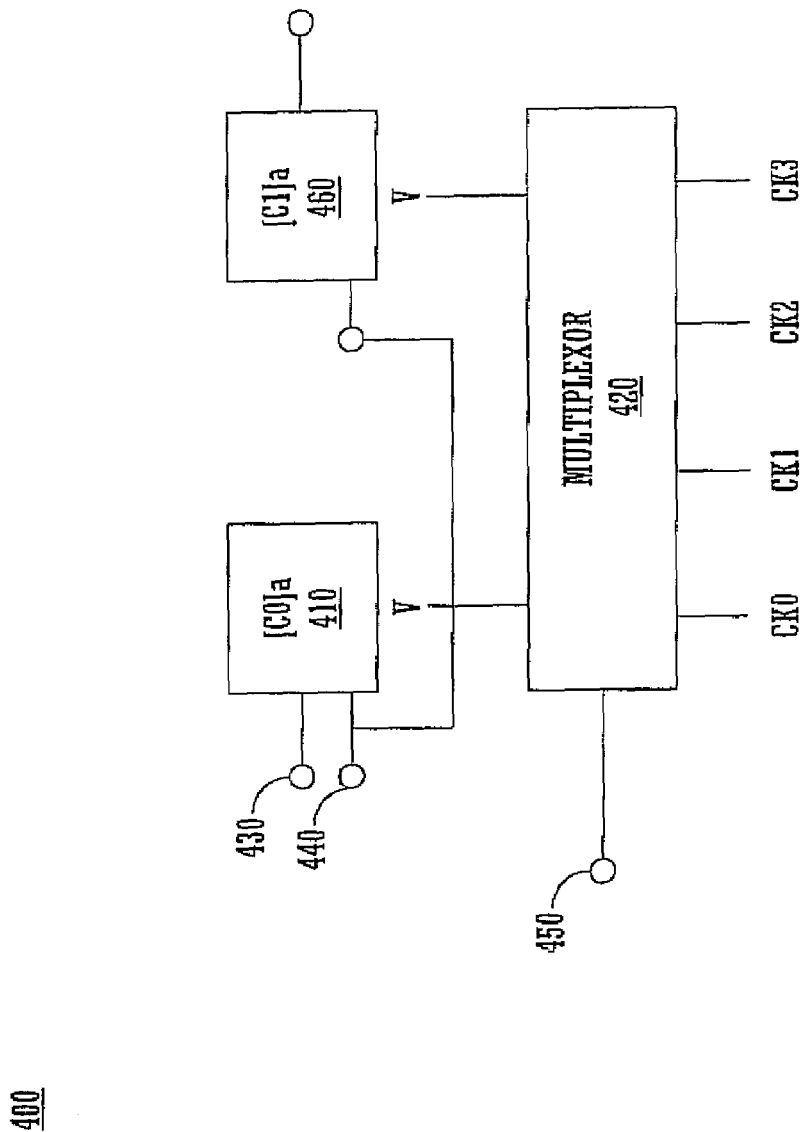
FIG. 4 is a diagram of a circuit that implements an address-space for scannable chains to reduce the time to scan in or out the target states of a scan chain, in accordance with one embodiment of the present invention.

The timeliness of this interface to examine the state of individual sub-sets of scan elements is clearly diminished as the number of chained scan-elements becomes large. The time to scan in or out all of the target state mirrored with the chain scales linearly with the length of the scan chain. As such, FIG. 4 is a diagram of a circuit 400 that implements an address-space for scannable chains to reduce the time to scan in or out partial state of the target system, in accordance with one embodiment of the present invention. As shown in FIG. 4, each addressable chain is indexed by a separate address chain.

As shown in FIG. 4, the circuit 400 includes a two element address space scan chain including scan elements 410 and 460. The address space scan chain is used to select between the various clocks (e.g., ck0, ck1, ck2, and ck3) that drive four separate scan chains.

The multiplexor 420 is used to select the appropriate clock. That is, the clock-multiplexor 420 directs scan clock signal 450 to one of a number (m) scan chains. In the present embodiment of FIG. 4, m=4. By extending the length of the address scan chain 430 and suitably scaling the multiplexor 420, a large number of independent scan chains can be indexed.

Each of the four selectable scan chains share common signals. For example, the capture signal, the input signal, and the output signal are shared. However, each scan chain obtains their respective scan clock from one and only one of the ck(m) clock signals of FIG. 4.

Figure 5:
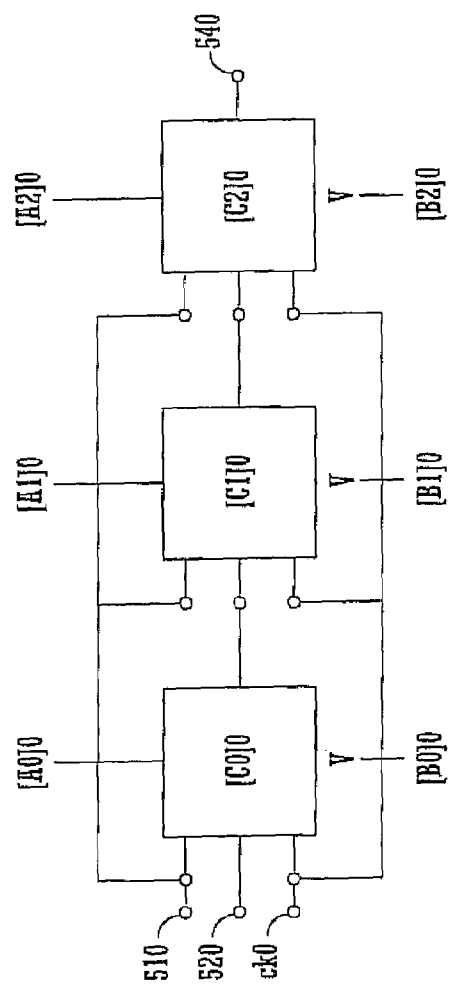
FIG. 5 is a diagram of a scan chain driven by the clock signal ck0 selected by a multiplexor from FIG. 4, in accordance with one embodiment of the present invention.

For example, FIG. 5 is a diagram of a scan chain 500 driven by the clock signal ck0 from FIG. 4, in accordance with one embodiment of the present invention. The value of the address ([C0]a, [C1]a) is entered through signal 430 and clocked via signal 440. If this address is (0,0), then the multiplexor 420 would begin to forward the scan-clock signal 450 to the scan-chain m=0 via the ck0 signal. As such, all subsequent scan-chain input and output via scan-clock signal 450, input signal 520, capture signal 510, and output signal 540 would concern one and only one scan-chain: that receiving the clock ck0 signal.

Method and System for Securing a Scan Test Interface

Embodiments of the present invention are capable of dynamically enabling a scan chain for a scan test interface only in the presence of a suitable processor internal state. Accordingly, embodiments of the present invention are able to secure the back-door exposure of scan chains which could thread through security sensitive or trusted elements of a system (e.g., integrated circuit).

Figure 6:
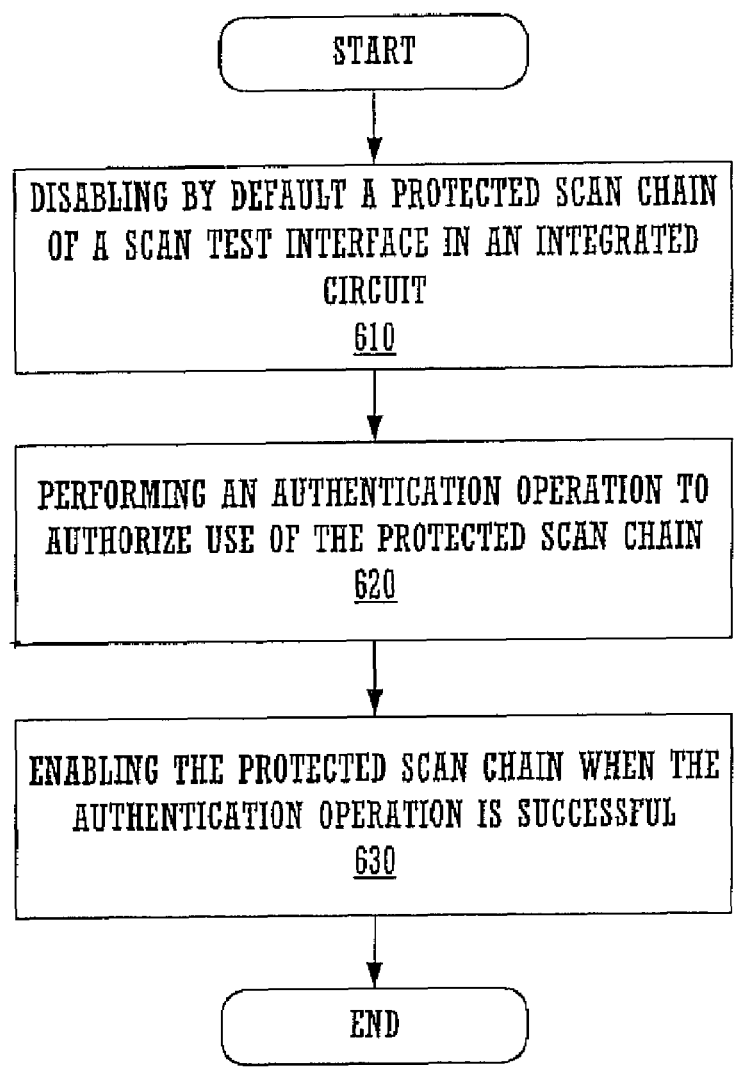
FIG. 6 is a flow diagram of steps in a computer implemented method for securing a scan test architecture, in accordance with one embodiment of the present invention.

FIG. 6 is a flow diagram 600 of steps in a computer implemented method for securing a scan test architecture, in accordance with one embodiment of the present invention. The flow diagram 600 is able to secure scan interfaces as an optional step during the manufacturing process of an integrated circuit that can be made cryptographically secure without embedding a cryptographic engine into the scan chain logic, in one embodiment.

At 610, the present embodiment disables a protected scan chain of a scan test interface in an integrated circuit. More specifically, the present embodiment disables the scan chain in its default state. That is, from the manufacturer, a scan chain is available, however, the scan chain is disabled until it is enabled with proper authorization.

The scan chain is protected in that the protected scan chain can only be used after proper authorization. As such, the scan chain is initially unusable and is thereafter enabled only with proper authorization.

At 620, the present embodiment performs an authentication operation to authorize use of the protected scan chain. One particular implementation for authentication is described below in conjunction with the discussion of FIG. 8, below. However, other embodiments of the present invention are well suited to implementing various other methods for authentication.

At 630, the present embodiment enables the protected scan chain when the authentication operation is successful. More specifically, the scan clock that drives the protected scan chain is enabled thereby providing functionality to the protected scan chain.

Figure 7:
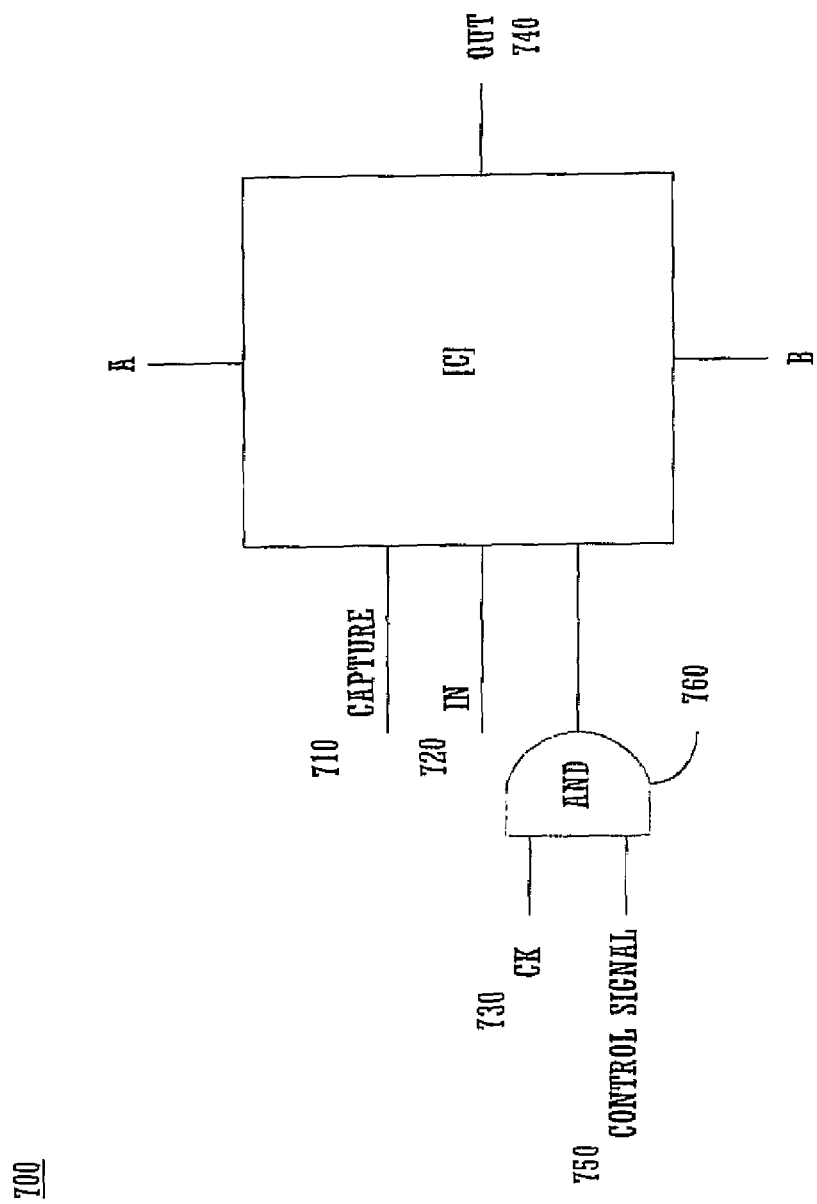
FIG. 7 is a diagram of a scan element that implements a protected scan chain for a scan test interface, in accordance with one embodiment of the present invention.

FIG. 7 is a diagram of a scan element 700 that implements a protected scan chain for a scan test interface. The scan element 700 provides an interface to internal logic storage elements [A] and [B]. The scan element 700 also holds a logic (true=1 or false=0) state [C].

For purposes of clarity and brevity, only a single scan element 700 is shown. However, in accordance with embodiments of the present invention, it is understood that the protected scan chain is comprised of one or more scan elements (e.g., scan element 700). The protected scan chain is controlled by the control signal 750, as will be described below.

The operation of the scan element 700 is similar to the operation of the scan element 100 of FIG. 1. However, scan element 700 illustrates a protected scan chain that is enabled through control signal 750. That is, the protected scan chain enables the scan clock signal 730 only when the control signal 750 is enabled. For example, in one embodiment, an AND logic block 760 enables the scan clock signal 730, or passes the scan clock signal 730, when the control signal 750 is a logic high.

As such, when the control signal 750 is enabled, the state of the scan logic [C] in FIG. 700 is mirrored into the out scan signal 740 on the rising edge of the scan-clock signal 730. Also, when the control signal 750 is enabled, on the falling edge of the scan-clock signal 730, the state of [C] is loaded from either target internal state [A], or the in scan signal 720 depending on the state of the capture signal 710. That is, when the control signal 750 is enabled, if the capture signal 710 is logic high on the falling edge of scan-clock signal 730, in one embodiment, then [C] is set from target internal state [A]. On the other hand, when the control signal 750 is enabled, if the capture signal 710 is logic low on the falling-edge of the scan-clock signal 730, then [C] is set from the in scan signal 720.

Figure 8:
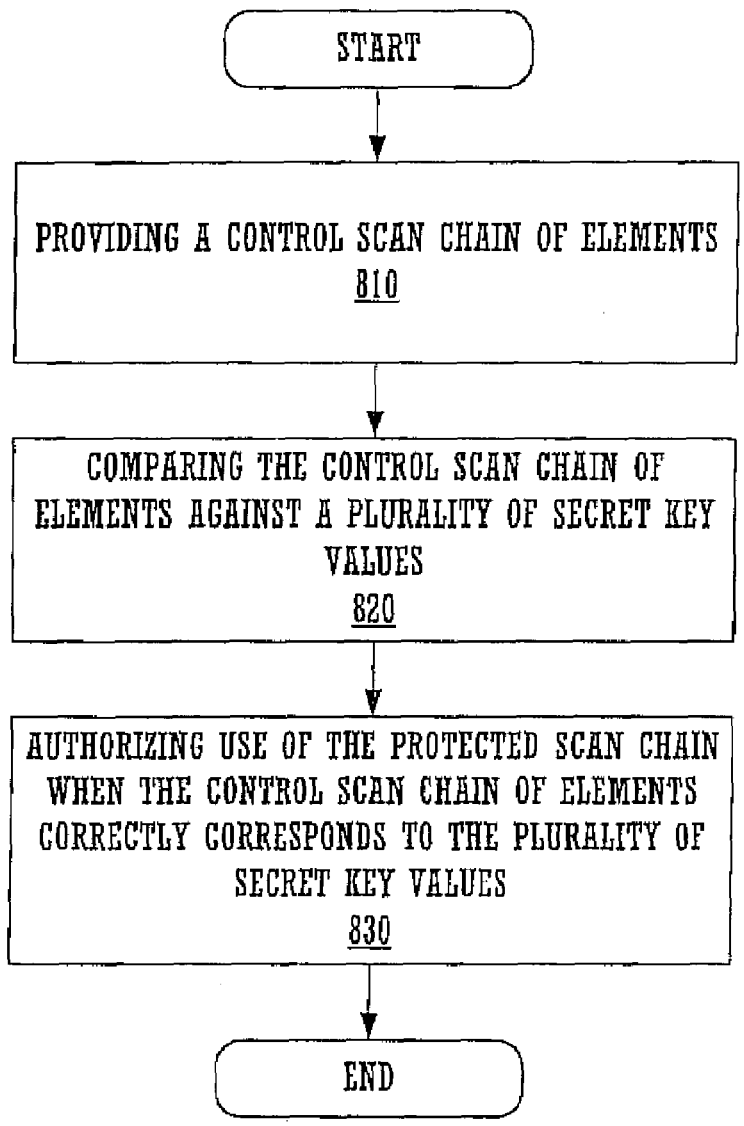
FIG. 8 is a flow diagram illustrating steps in a computer implemented method for securing a scan test architecture, in accordance with one embodiment of the present invention.

FIG. 8 is a flow chart 800 illustrating steps in a computer implemented method for securing a scan test architecture, in accordance with one embodiment of the present invention. The present embodiment is capable of employing a scan chain to authenticate the use of other protected scan chains. More specifically, an authentication step is required to complete the process of enabling the protected scan chain(s). That is, the present embodiment is able to internally perform the authentication that is used to secure protected scan chains.

At 810, the present embodiment provides a control scan chain of elements. The control scan chain provides an input to the processor. In one embodiment, the control scan chain is unprotected.

At 820, the present embodiment compares the control scan chain of elements against a plurality of secret key values. The plurality of secret key values is permanently and physically manifested within the processor within which the protected scan chain is located for providing an authenticated window to the internal state of the processor.

At 830, the present embodiment authorizes use of a protected scan chain when the control scan chain of elements correctly corresponds to said plurality of secret key values. A control signal is generated that indicates whether use of the protected scan chain is authorized.

Figure 9:
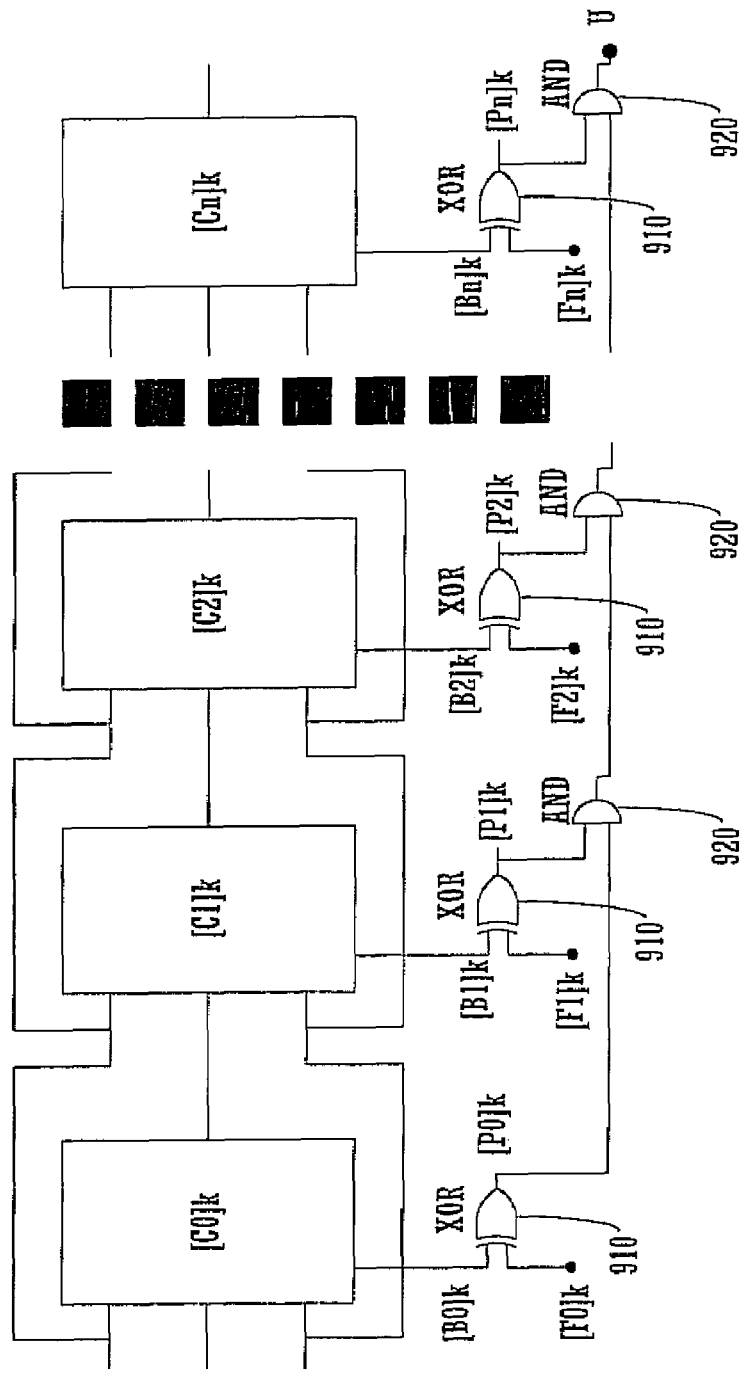
FIG. 9 is a block diagram of a integrated circuit that is capable of securing a scan test architecture, in accordance with one embodiment of the present invention.

Turning now to FIG. 9, authentication logic of a target system is shown that is used for generating a control signal U used to authorize use of a protected scan chain, in accordance with one embodiment of the present invention. The purpose of the authentication logic is to affect the state of the control signal U.

As shown in FIG. 9, a candidate authentication state, {Bn}k, is inputted as a control scan chain into the authentication logic 900 via the scan in pin. More specifically, the values initialized from the control scan chain, {Bn}k, are compared with a secret key value, {Fn}k, that are known to the authentication logic. The control scan chain is used only for authentication input within the confines of the system that is performing the authentication within the integrated circuit.

The control scan chain is unprotected so that input values, {Cn}k, can be inserted as values for the control scan chain, {Bn}k. For example, input values can be inserted to the integrated circuit for each element of the control scan chain through the {Bn}k processor state. As such, a user with the proper control scan chain input values, {Bn}k, is able to provide proper authentication within the system performing the authentication of the protected scan chain. That is, the control scan chain is used to authenticate use of the protected scan chain of the integrated circuit.

In one embodiment, the power on default for the state held in the unprotected control scan, {Cn}k, chain is defaulted to a particular state. For instance, in one embodiment, the default for all elements in the unprotected control scan chain is zero (0).

In one embodiment, an XOR logic operation is performed for each element in the control scan chain with a corresponding secret key value. This is performed to obtain a plurality of values. More specifically, an XOR logic operation is performed on the value from each element of the control scan chain, {Bn}k, and a corresponding secret key value, {Fn}k, known to the authentication logic. In one embodiment, the plurality of secret key values are only accessible by components of the authentication logic used to perform authentication.

Each value from {Fn}k is logically combined through an XOR gate 910 with the {Bn}k value of the control scan chain of the corresponding element. The plurality of values is represented by a set of signals {Pn}K, where in equation 1:

$$\{Pn\}k = \{Bn\}k\ XOR\ \{Fn\}k \tag{1}$$

When the output of the XOR logic operation is a predicted result, proper authentication is achieved. More specifically, proper authentication is achieved when the values of the control scan chain are closely associated with the plurality of secret key values.

In one embodiment, the close association between the control scan chain, {Bn}k, and the plurality of secret key values is an inverse relationship. That is, the values of the unprotected control scan chain, {Bn}k, are inverses of corresponding values of the secret key. As such, when performing an XOR logic operation, when values of the unprotected control scan chain are inverses of corresponding values of the plurality of secret key values, a logic high value for {Pn}k is generated, in one embodiment.

More particularly, proper authentication is achieved when values for the unprotected control scan chain, {Bn}k, is a modulo twos complement of a corresponding key value in the plurality of secret key values.

As shown in FIG. 9, the control signal U is generated by logically performing an AND operation on all of the plurality of values {Pn}k. That is, each of the plurality of values is logically combined through at least one AND logic gate 920. A control signal U represents the output signal of the combined AND logic operation.

In one embodiment, the authentication operation is determined to be successful when the control signal U is a logic high. That is, each of the plurality of values, {Pn}K, is a logic high, and as such, performing an AND operation on the plurality of values generates a logic high for the control signal U.

As a result, in one embodiment, by logically performing the AND operation on the plurality of values, the present embodiment can determine if the current state of the control scan chain is equivalent, through a modulo two's complement, to the values {Fn}k.

The present embodiment controls the protected scan chain of a scan test interface using the control signal U. That is, when values of the control scan chain are inverses of corresponding values of the plurality of secret key values, the control signal U is high (1), and the protected scan chain is enabled.

More specifically, a scan clock signal for the protected scan chain is enabled when the control signal is high (1). Conversely, when values of the control scan chain are not inverses of corresponding values of the secure scan chain, the control signal U is low (0) and the protected scan chain is disabled. More specifically, a scan clock signal for the protected scan chain is not enabled when the control signal is low (0). In one embodiment, the scan clock signal for the protected scan chain is disabled in its default state.

Figure 10:
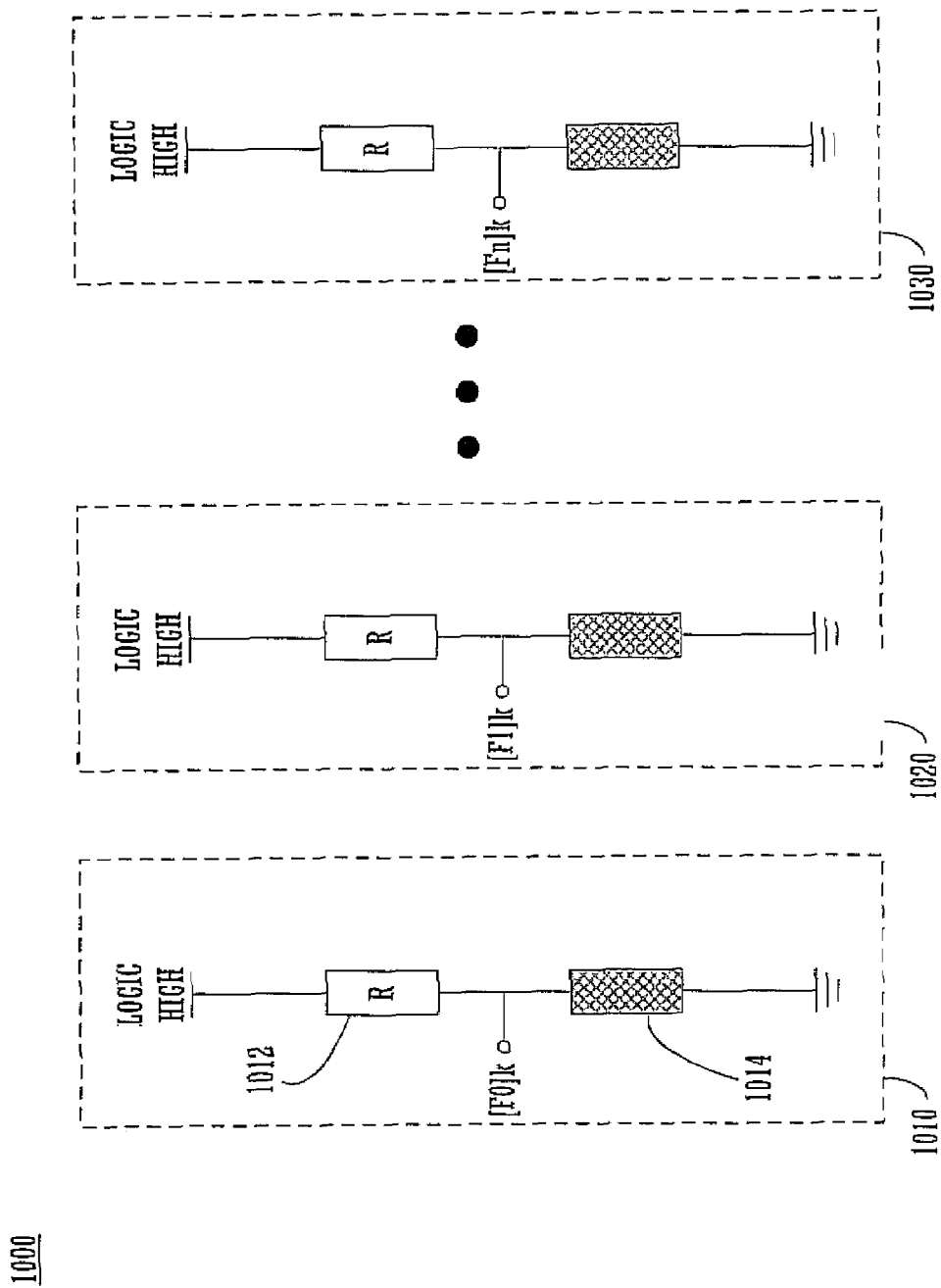
FIG. 10 is a diagram illustrating a plurality of fusible links that comprise a secure scan chain, in accordance with one embodiment of the present invention.

FIG. 10 is a diagram illustrating the plurality of fusible links 1000 that comprises the secret key state of the authentication logic. That is, the plurality of secret key values is obtained from fused values within the scan test architecture. As such, the plurality of fusible links 1000 is used to generate the plurality of secret key values, {Fn}k, of the authentication logic of FIG. 9. The inherent scalability of the plurality of secret key values is achieved by adding scan elements to the scan chain.

In one embodiment, the plurality of secret key values is a random number. Generation of the random number can be through any means. In one embodiment, generation of the random number is associated with the manufacturing process of the processor die of the integrated circuit.

The logic of the plurality of secret key values as implemented within the plurality of fusible links 1000 is not externally scannable. Also, plurality of secret key values in embodiments of the present embodiment is not visible in a direct way to a program running on the processor, for example. That is, the plurality of secret key values is never exposed outside the authentication logic used to implement protected scan within the integrated circuit.

By way of example, the random number is manifested by permanently setting a binary state in each of the plurality of fusible links 1000. As such, each of the plurality of fusible links 1000 stores one bit of information, {Fn}k. Taken as a whole, the states of each of the plurality of fusible links comprise the random number of the plurality of secret key values.

In exemplary FIG. 10, the plurality of n fusible links is comprised of the following fusible links: 1010, 1020, on up to the nth fusible link, 1030. As such, the plurality of fusible links represents a binary representation of the secret key. For instance, each of the plurality of fusible links includes a resistor R and a fuse. As an example, fusible link 1010 includes a resistor 1012 and a fuse 1014.

The binary states in the plurality of fusible links are established by completing a circuit path through the fuse or destroying a circuit path through the fuse. In one implementation, a fusible link that completes a circuit path through the fuse as coupled to other circuit elements creates a logic low level (1). Correspondingly, a fusible link that does not complete a circuit path through the fuse as coupled to other circuit elements creates a logic high level.

To achieve a logic high value as represented by the fusible link, the fuse is blown. For example, in the fusible link 1010, fuse 1014 is blown so that the value of $\{F0\}k$ runs to the logic high value through the resistor 1012. On the other hand, to achieve a logic low value as represented by the fusible link, the fuse is not blown. For example, in the fusible link 1010, fuse 1014 is left intact so that the value of $\{F0\}k$ runs to ground, and is at a logic low value.

Protecting the Secret Key Values

The plurality of secret key values is a random number of sufficient length to avoid discovery by brute-force attack. In one embodiment the random number comprises 128 bits. As such, the plurality of fusible links 1000 comprises 128 fusible links to comprise the random number of the plurality of secret key values. While the present embodiment presents the plurality of secret key values of a length 128 bits, other embodiments are well suited to random numbers comprising more than 128 bits, or less than 128 bits.

Although the present embodiment discloses the permanent storage of the random number representing the secure scan chain through a plurality of fusible links, other embodiments are well suited to other means for permanently storing the random number within the integrated circuit.

Although the present embodiment discloses accessing the random number that is permanently stored in the plurality of fusible links 1000, other embodiments are well suited to verifying a random number through a cryptographic means, such as, digital signature verification.

In one embodiment, the plurality of secret key values is implemented during manufacturing the integrated circuit. More specifically, a random number is generated during manufacturing and inputted into corresponding processors as the plurality of secret values. In addition, the random number is identical for all of the integrated circuits of the same model.

For example, the present embodiment computes the control signal U based on a secret key fixed length, and whose value, $\{Fn\}k$, is common to all devices of the same integrated circuit design. As such, knowing the plurality of secret key values of the secure scan chain, $\{Fn\}k$, enables all the protected scan-chains on all the integrated circuits.

Without access to the plurality of secret key values, guessing the plurality of secret key values would require testing on average 2-to-the-power-of-(n−1) values per integrated circuit design.

In another embodiment, a more secure method for securing protected scan chain usage is by protecting each processor with a per processor plurality of secret key values. That is, each processor die has a unique plurality of secret key values, $\{Fn\}k$.

To manage the plurality to secret key values, the processor die is associated with a unique identifier. This unique identifier is made available via an unprotected scan-chain, in accordance with one embodiment. That is, the processor supports two unprotected scan-chains: one identifying the processor (e.g., through a readable scan-chain whose "capture" operation is used to obtain the unique identifier fused into the processor; and a second scan chain that is the control scan chain for comparing a scanned-in string with the processors fused plurality of secret key values that are used to generate the control signal U.

The mapping from the unique identifier to the values for the control scan chain need not be managed by the processor. This management can occur externally to the processor. For example, the unique identifier and the control scan chain can be random values whose correspondence is maintained via a database secured and kept as proprietary information by the manufacturer of the processors, in one embodiment.

Alternatively, the plurality of secret key values is an encrypted form of the unique identifier. That is, the selected encryption keys and encryption algorithm of choice (e.g., symmetric or asymmetric cipher) are private to the manufacturer.

In still another embodiment, the plurality of secret key values need not be exposed externally to the protected processor, even during the manufacturing flow of the processor. This is achieved by implementing an internal cryptographic engine and the use of write-once fuses. As such, since the processor itself is used to generate the plurality of secret key values, the security of the plurality of secret key values is absolute.

In the present embodiment, a fully functional encryption engine is internal to the processor. For instance, in one embodiment, the encryption engine is capable of performing triple DES in a number of modes (ECB, CBC, etc.) on the plurality of secret values. While the present embodiment implements triple DES cryptography mechanism, other embodiments are well suited to using other cryptography mechanisms, such as, AES, or RSA.

More specifically, the write-once interface generates the plurality of secret key values, $\{Fn\}k$. In one embodiment, the present embodiment is able to instruct the processor to internally generate a random number as the plurality of secret key values, $\{Fn\}k$. The present embodiment permanently writes the plurality of secret key values, $\{Fn\}k$, into the processor through the use of write-once fuses. That is, the write-once interface as directed by the processor is able to permanently write a one or a zero to the write-once fuses, as represented by $\{Fn\}k$.

Additionally, the processor is able to encrypt the plurality of secret key values, $\{Fn\}k$, using the public key of a private/public asymmetric key pair. The encrypted form of the plurality of secret key values is externally accessible.

As such, discovery of the plurality of secret key values is obtained by decrypting the encrypted form of the plurality of secret key values using the private key. That is, the encryption algorithm is performed on the encrypted form of the plurality of secret key values using the private key in the asymmetric key pair to obtain the plurality of secret key values.

In one embodiment, the private key is maintained in a secure database, for example, by the manufacturer or designer of the processor. In this manner, the plurality of secret values is maintained in a database, and the only exposure to the plurality of secret values is through a private key as associated with the processor.

The database also provides the necessary mapping of the private key to the proper unique identifier that is associated with the integrated circuit. As described previously, the unique identifier is permanently written to an unprotected scan chain in the processor.

Additionally, the present embodiment inverts each of the plurality of secret key values as inputs to the control scan chain. In this way, proper authentication is achieved when enabling an associated protected scan chain.

Over the lifetime of a product many asymmetric key-pairs may be used, and the economic value of a stolen private key need not scale with the volume of processors shipped.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

Embodiments of the present invention, a method and system for securing a scan test architecture by performing an authentication operation to authorize use of a protected scan chain. While the present invention has been described in particular embodiments, it should be appreciated that the present invention should not be construed as limited by such embodiments, but rather construed according to the below claims.

What is claimed is:

1. A method for securing a scan test architecture, the method comprising:
    performing an authentication operation to authorize use of a protected scan chain of a scan test interface, wherein said performing an authentication operation includes:
    providing a control scan chain of elements; and
    comparing said control scan chain of elements against a plurality of secret key values, wherein said plurality of secret key values is a random number.

2. The method of claim 1, wherein said performing an authentication operation further comprises:
    authorizing use of said protected scan chain if said control scan chain of elements correctly corresponds to said plurality of secret key values.

3. The method of claim 2, wherein said authorizing use of said protected scan chain further comprises:
    authorizing use of said protected scan chain if each of said control scan chain of elements is a modulo twos complement of a corresponding key value in said plurality of key values.

4. The method of claim 2, wherein said authorizing use of said protected scan chain further comprises:
    authorizing use of said protected scan chain if each of said control scan chain of elements is an inverse of a corresponding key value in said plurality of key values.

5. The method of claim 1, wherein said comparing said control scan chain of elements further comprises:
    performing a XOR logic operation for each element in said control scan chain with a corresponding secret key value to obtain a plurality of values; and
    performing at least one AND logic operation on said plurality of values to generate a control signal.

6. The method of claim 1, further comprising:
    disabling by default said protected scan chain of said scan test interface.

7. The method of claim 1, wherein said plurality of secret key values comprises a plurality of fused values within said scan test architecture.

8. The method of claim 1, wherein said plurality of secret key values is encrypted.

9. The method of claim 1, wherein said scan test interface comprises a Joint Test Action Group (JTAG) scan test interface.

10. An integrated circuit, comprising:
    an unprotected control scan chain;
    a plurality of secret key values, wherein said unprotected control scan chain is used to authenticate use of a protected scan chain of said integrated circuit; and
    a plurality of XOR logic blocks configured to perform an XOR logic operation on each element of said unprotected control scan chain and a corresponding secret key value to obtain a plurality of values.

11. The integrated circuit of claim 10, further comprising:
    at least one AND logic block configured to perform an AND logic operation on said plurality of values to generate a control signal.

12. The integrated circuit of claim 11, wherein said unprotected control scan chain is configured to accept input values, such that if values of said unprotected control scan chain are not inverses of corresponding values of said plurality of secret key values, said control signal is low.

13. The integrated circuit of claim 10, further comprising:
    a control block configured to control said protected scan chain of a scan test interface.

14. The integrated circuit of claim 13, wherein said control block is configured to enable a clock signal for said protected scan chain.

15. The integrated circuit of claim 13, wherein said control block is configured to disable a clock signal for said protected scan chain.

16. A computer system, comprising:
    a processor configured to process information; and
    a computer-readable memory coupled to said processor and containing program instructions that, when executed, cause said processor to implement a method for securing a scan test architecture, the method including:
        performing an authentication operation to authorize use of a protected scan chain of a scan test interface, wherein said performing an authentication operation comprises:
        providing a control scan chain of elements; and
        comparing said control scan chain of elements against a plurality of secret key values, wherein said plurality of secret key values includes a plurality of fused values within said scan test architecture.

17. The computer system of claim 16, wherein said performing an authentication operation further comprises:
    authorizing use of said protected scan chain if said control scan chain of elements correctly corresponds to said plurality of secret key values.

18. The computer system of claim 17, wherein said authorizing use of said protected scan chain further comprises:
    authorizing use of said protected scan chain if each of said control scan chain of elements is a modulo twos complement of a corresponding key value in said plurality of key values.

19. The computer system of claim 16 wherein said comparing said control scan chain of elements further comprises:
    performing a XOR logic operation for each element in said control scan chain with a corresponding secret key value to obtain a plurality of values; and
    performing at least one AND logic operation on said plurality of values to generate a control signal.

20. The computer system of claim 16, further comprising:
    disabling by default said protected scan chain of said scan test interface.

* * * * *